United States Patent [19]

Totani et al.

[11] 4,282,780
[45] Aug. 11, 1981

[54] ELECTRIC CONTROL APPARATUS FOR AUTOMATIC TRANSMISSIONS

[75] Inventors: Shinzo Totani, Nagoya; Takaaki Kato, Toyohashi, both of Japan

[73] Assignee: Nippondenso Co., Ltd., Kariya, Japan

[21] Appl. No.: 44,933

[22] Filed: Jun. 4, 1979

[30] Foreign Application Priority Data

Jun. 6, 1978 [JP] Japan ................... 53/68076

[51] Int. Cl.³ ...................... B60K 41/06; B60K 41/10
[52] U.S. Cl. ........................................ 74/866; 74/861
[58] Field of Search ................ 74/866, 843, 856, 861, 74/DIG. 6

[56] References Cited

U.S. PATENT DOCUMENTS

| | | | |
|---|---|---|---|
| 3,680,410 | 8/1972 | Sumiyoshi et al. | 74/866 |
| 3,726,157 | 4/1973 | Marumo | 74/866 X |
| 3,726,159 | 4/1973 | Mizote | 74/866 |
| 3,732,755 | 5/1973 | Beig et al. | 74/866 |
| 3,738,196 | 6/1973 | Kubo et al. | 74/866 |
| 3,739,661 | 6/1973 | Harrison | 74/866 |
| 3,881,368 | 5/1975 | Furuhashi | 74/866 |
| 3,898,894 | 8/1975 | Aono et al. | 74/866 |
| 3,942,393 | 3/1976 | Föster et al. | 74/866 |

FOREIGN PATENT DOCUMENTS

| | | |
|---|---|---|
| 2013079 | 9/1971 | Fed. Rep. of Germany ......... 74/843 |
| 2416838 | 10/1974 | Fed. Rep. of Germany ......... 74/866 |
| 1493191 | 11/1977 | United Kingdom ................ 74/866 |

*Primary Examiner*—Leslie Braun
*Attorney, Agent, or Firm*—Cushman, Darby & Cushman

[57] ABSTRACT

In an electric control apparatus for an automatic transmission, a shift pattern for conducting shift operation of the transmission may be controlled in accordance with various loads given to the prime engine of a vehicle to thereby ensure good driveability during travel of the vehicle.

7 Claims, 6 Drawing Figures

ELECTRIC CONTROL APPARATUS FOR AUTOMATIC TRANSMISSIONS

BACKGROUND OF THE INVENTION

The present invention relates to an electric control for an automatic transmission of an automotive vehicle, and more particularly to an electric transmission control apparatus to conduct shift operation of the transmission on a basis of a shift pattern defined by a desired relationship between the vehicle speed and a throttle opening angle of the prime engine.

SUMMARY OF THE INVENTION

It is a primary object of the present invention to provide an electric transmission control apparatus in which the shift pattern may be controlled in accordance with various loads given to the prime engine to thereby ensure good driveability during travel of the vehicle.

According to the present invention, there is provided an electric control apparatus for an automatic transmission of an automotive vehicle, the transmission having electrically operated shift means for conducting one of upshift and downshift operations of the transmission upon energization thereof and conducting the other shift operation of the transmission upon deenergization thereof, the electric control apparatus comprising:

first means for producing a first electric signal indicative of the vehicle speed;

second means for producing a second electric signal indicative of a throttle opening angle of the prime engine;

third means for producing a third electric signal indicative of loads given to the prime engine;

control means responsive to the first and third electric signals for calculating a first value of the throttle opening angle based on a shift pattern defined by a desired relationship among the vehicle speed, the throttle opening angle and the various loads, the control means compensating the shift pattern in accordance with a value of the third electric signal and being responsive to the second electric signal to compare the calculated first value with a second value represented by the second electric signal for producing a first control signal when the first value is smaller than the second value and producing a second control signal when the first value is larger than the second value; and drive means for energizing the shift means in response to the first control signal from the control means and for deenergizing the shift means in response to the second control signal.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
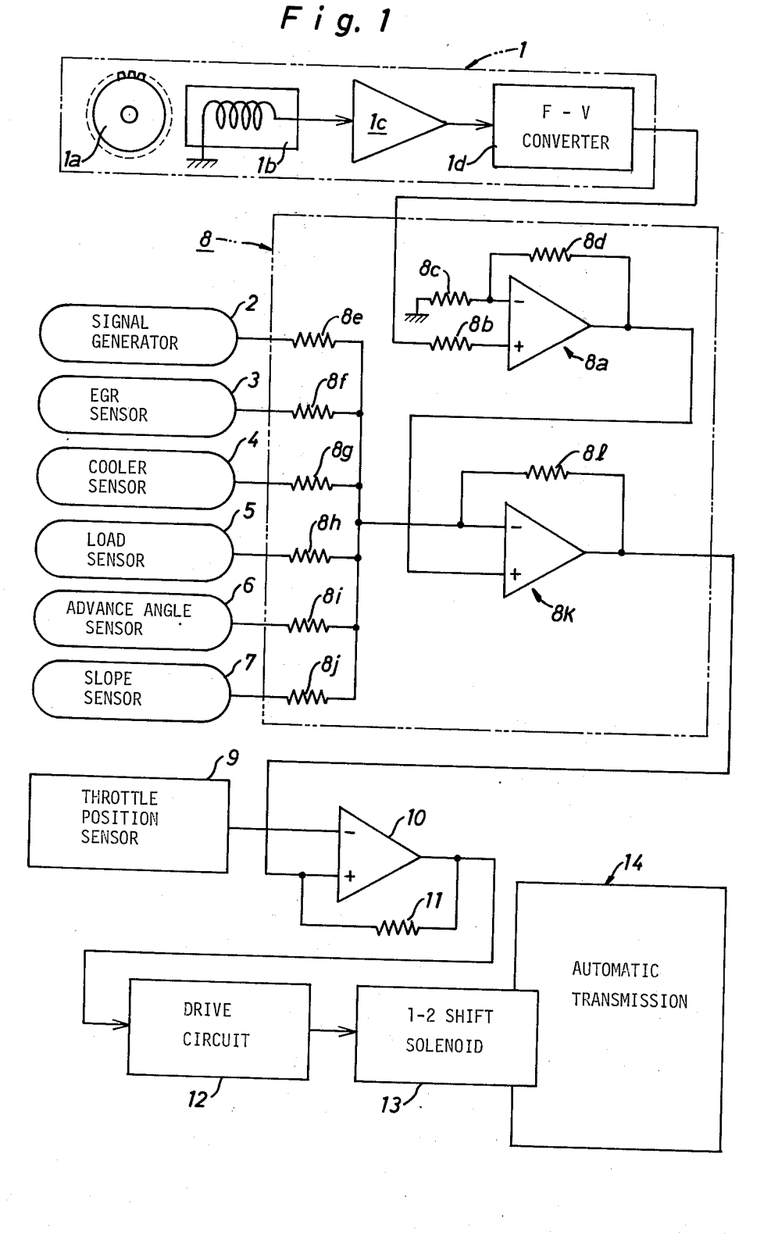
FIG. 1 is a schematic block diagram of an electric transmission control apparatus for an automatic transmission in accordance with the present invention.

Referring now to FIG. 1 of the drawings, there is illustrated a schematic block diagram of an electric transmission control apparatus in accordance with the present invention which is adapted to a conventional automatic transmission 14 for an automotive vehicle. The transmission 14 is drivingly coupled to a combustion engine of the vehicle and is provided with a manual shift lever to be selectively positioned in its Neutral, Parking, Drive, Low, and Reverse positions. While the transmission 14 is conditioned in its Neutral range, an ignition switch for the engine is disconnected from a vehicle battery. Upon shifting the transmission 14 to its Parking range, the ignition switch is connected to the vehicle battery and disconnected from a voltage stabilizer. When the transmission 14 is shifted to its Drive range, the voltage stabilizer is connected to the battery through the ignition switch to receive an electric voltage from the battery so as to produce a constant voltage therefrom. It is also noted that the transmission 14 is provided with a 1-2 shift solenoid 13 for selectively conducting the shift operation between first and second forward speed ranges under the Drive range of the transmission 14.

Figure 2:
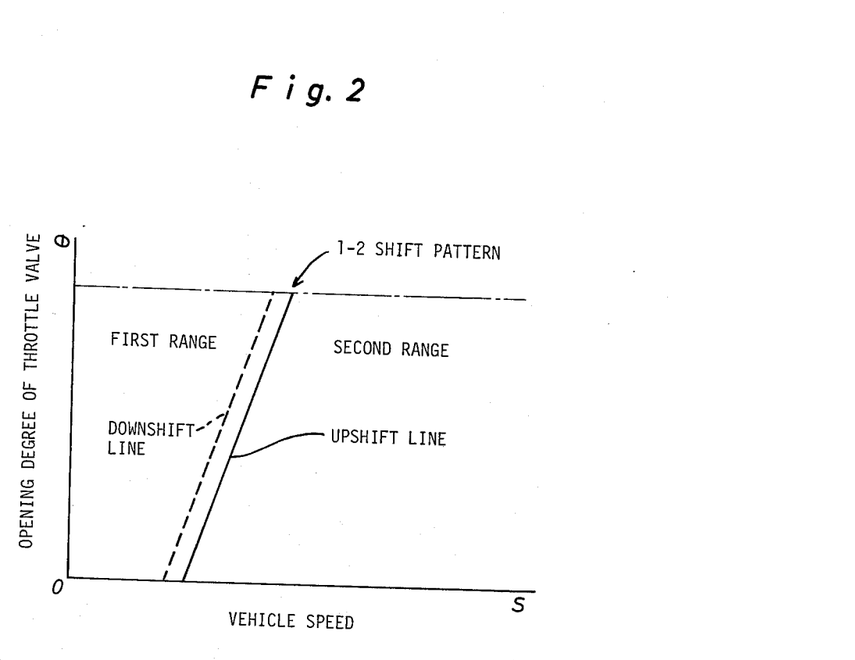
FIG. 2 is a graph indicating a shift pattern for the transmission of FIG. 1.

The electric control apparatus comprises a signal generator 2 and various sensors to respectively detect operative conditions of the vehicle. The signal generator 2 serves to produce an electric signal indicative of a constant voltage $b_0$ defining a reference point on a reference shift pattern (See FIG. 2) for controlling shift operation of the transmission 14. A speed sensor 1 includes an electromagnetic pick up transducer 1b connected through a wave shaper 1c to a frequency-to-voltage or F-V converter 1d. The transducer 1b is located in magnetic coupling relationship with a toothed gear 1a driven by a road wheel of the vehicle. When the gear 1a rotates, the transducer 1b detects each tooth of gear 1a to produce an electric alternating signal having a frequency proportional to vehicle speed. The wave shaper 1c reshapes the alternating signal into a rectangular pulse signal having the same frequency as that of the alternating signal. The frequency of the rectangular pulse signal from wave shaper 1c is converted by the F-V converter 1d into an electric signal in the form of an analog voltage indicative of vehicle speed. An exhaust gas recirculation or EGR sensor 3 is provided in an EGR system for the engine to detect operation of the EGR system. The EGR sensor 3 produces therefrom an electric signal with a low or zero level during deactivation of the EGR system. The EGR sensor 3 also produces therefrom an electric signal with a high level $b_1$ upon activation of the EGR system.

A cooler sensor 4 is provided on a car cooler for the vehicle to detect operation of a compressor of the car cooler. The cooler sensor 4 produces therefrom an electric signal with a low or zero level during deactivation of the car cooler. The cooler sensor 4 also produces therefrom an electric signal with a high level $b_2$ upon activation of the car cooler. A load sensor 5 is provided on a suspension mechanism of the vehicle to detect an amount of loads on the vehicle so as to produce an electric signal with a level $b_3$, which the level $b_3$ is proportional to the amount of loads. An ignition spark angle sensor 6 is provided on an ignition spark advancer within a distributor of the engine. The angle sensor 6 detects an advancing degree of the spark advancer to produce an electric signal with a level $b_4$ in inverse proportion to the advancing degree. A slope sensor 7 is provided on a portion of the vehicle to detect a slant degree of the vehicle, the sensor 7 producing therefrom an electric signal with a level $b_5$ proportional to the slant degree. A throttle position sensor 9 is a potentiometer which has a sliding contact coupled to a throttle valve for the engine. The sensor 9 detects an opening degree of the throttle valve to produce therefrom an electric signal or in the form of an analog voltage indicative of the opening degree $\theta$.

The electric transmission control apparatus also comprises an electrical calculation circuit 8 which is provided with a first operational amplifier 8a connected to the speed sensor 1 and with a second operational amplifier 8k connected to the signal generator 2 and sensors 3 to 7. The first operational amplifier 8a has a first input terminal grounded through an input resistor 8c of a resistance value $R_a$ and a second input terminal for receiving the electric signal from the F-V converter 1d through an input resistor 8b. The amplifier 8a also has an output terminal connected to the first input terminal through a negative feedback resistor 8d of a resistance value $R_b$. The feedback resistor 8d defines an amplitude K or $R_b/R_a$ of amplifier 8a together with the first input resistor 8c. With the operational amplifier 8a, the analog voltage S defined by the electric signal from speed sensor 1 is amplified and multiplied by the amplitude K.

The second operational amplifier 8k is provided with a first input terminal for receiving the electric signals from the signal generator 2 and sensors 3 to 7 respectively through input resistors 8e to 8j and is further provided with a second input terminal for receiving an electric signal indicative of the multiplied value KS from the first operational amplifier 8a. The second operational amplifier 8k has an output terminal connected to the first input terminal through a negative feedback resistor 8l of a resistance value $R_0$. The input resistors 8e and 8f have resistance values $R_{10}$ and $R_{11}$ respectively to define weighted coefficients $R_0/R_{10}$ and $R_0/R_{11}$ of the amplifier 8k together with the feedback resistor 8l. The input resistors 8g and 8h have resistance values $R_{12}$ and $R_{13}$ respectively to define weighted coefficients $R_0/R_{12}$ and $R_0/R_{13}$ together with the resistor 8l. The input resistors 8i and 8j also have resistance values $R_{14}$ and $R_{15}$ respectively to define weighted coefficients $R_0/R_{14}$ and $R_0/R_{15}$ together with the resistor 8l. These weighted coefficients $R_0/R_{10}$ to $R_0/R_{15}$ are indicated as $a_0$ to $a_5$ respectively in the following description.

The second operational amplifier 8k, in conjunction with resistors 8e–8j, calculates a value of l or $(a_0b_0 + a_1b_1 + a_2b_2 + a_3b_3 + a_4b_4 + a_5b_5)$ by using the electric signals from the generator 2 and sensors 3 to 7 and thereafter subtracts the calculated value l from the multiplied value KS. The subtracted value (KS−l) is applied to a comparator 10 as an electric signal. In this case, the subtracted value (KS−l) satisfies a linear function $(\theta = KS - l)$ describing a desired relationship between an opening degree $\theta$ of the throttle valve and vehicle speed. In the linear function, the amplitude K represents a slope of the function, and the character l represents an intercept of the function. As understood from the above description, the linear function is designated as $(\theta = KS - a_0b_0)$ to define the reference shift pattern of FIG. 2, when each of the levels $b_1$ to $b_5$ is zero. Furthermore, it will be noted that the linear function may be displaced in accordance with changes of the intercept l toward leftward or rightward in FIG. 2.

The comparator 10 has a first input terminal for receiving the electric signal from the throttle position sensor 9 and a second input terminal for receiving the electric signal from the amplifier 8k. When a level of the electric signal from operational amplifier 8k is lower than that of the electric signal from sensor 9, the comparator 10 produces a low level signal therefrom. When the level of the electric signal from amplifier 8k is higher than that of the electric signal from sensor 9, the comparator 10 produces a high level signal therefrom. The low and high level signals from the comparator 10 are respectively applied to a drive circuit 12. The comparator 10 also has an output terminal connected to the second input terminal through a positive feedback resistor 11. While the comparator 10 produces the low level signal, the feedback resistor 11 serves to define the reference shift pattern as an upshift line shown by a solid line in FIG. 2. When the comparator 10 produces the high level signal, the upshift line is shifted due to positive feedback effect of the resistor 11 to a downshift line shown by a dotted line in FIG. 2. In this instance, a spacing between the upshift and downshift lines indicates hysteresis in the electric transmission control apparatus for preventing fluctuation between the first and second forward speed ranges. The drive circuit 12 serves to energize the 1–2 shift solenoid 13 in response to the low level signal from comparator 10 such that the transmission 14 is conditioned in the first forward speed range. The drive circuit 12 also deenergizes the 1–2 shift solenoid 13 in response to the high level signal from comparator 10 such that the transmission 14 is conditioned in the second forward speed range.

MODE OF OPERATION

While the shift lever is conditioned in the Neutral position to maintain the transmission 14 in the Neutral range, the ignition switch is disconnected from the vehicle battery. When the shift lever is shifted from the Neutral position to the Parking position, the transmission is conditioned in the Parking range, and the ignition switch is connected to the vehicle battery. When the ignition switch is actuated, the engine is cranked and is then started. At this stage, the voltage stabilizer is disconnected from the ignition switch to condition the electric transmission control apparatus inoperative.

When the shift lever is shifted from the Parking position to the Drive position, the transmission is conditioned in the Drive range, and the voltage stabilizer produces the constant voltage upon receiving the electric voltage from the battery to condition the electric control apparatus in its operation. At this stage, the speed sensor 1 produces an electric signal with a zero level due to standstill of the vehicle. The EGR sensor 3 also produces an electric signal with a zero level because of deactivation of the EGR system, and the cooler sensor 4 produces an electric signal with a zero level due to deactivation of the car cooler. The signal generator 2 also produces an electric signal indicative of the constant voltage $b_0$, and the load sensor 5 produces an electric signal with a level $b_3$ proportional to an amount of vehicle loads. The advance angle sensor 6 produces an electric signal with a level $b_4$ corresponding to an advancing degree defined by operation of the ignition spark advancer. The slope sensor 7 produces an electric signal with a level $b_5$ proportional to a slant degree of the vehicle, and the throttle position sensor 9 produces an electric signal with a zero level due to a fully closed position of the throttle valve. Then, the electric signal from speed sensor 1 is applied to the first operational amplifier 8a, and the electric signals from the generator 2 and sensors 3 to 7 are applied to the second operational amplifier 8k. The electric signal from sensor 9 is also applied to the comparator 10.

When the first operational amplifier 8a receives the electric signal from speed sensor 1, as previously described, the zero level defined by the electric signal from sensor 1 is multiplied by the amplitude K and is produced from the amplifier 8a as an electric signal with a zero level. When the second operational amplifier 8k receives the electric signal from first operational amplifier 8a together with the electric signals from the generator 2 and sensors 3 to 7, a value $(a_0b_0+a_3b_3+a_4b_4+a_5b_5)$ or $l_1$ is calculated in the operational amplifier 8k by using the constant voltage $b_0$ and levels $b_3$, $b_4$, $b_5$. Then, the calculated value $l_1$ is subtracted in the amplifier 8k from the zero level defined by the electric signal from speed sensor 1. When the comparator 10 receives an electric signal indicative of the subtracted value $(-l_1)$ from the second operational amplifier 8k together with the electric signal having the zero level from the throttle position sensor 9, a low level signal is produced from the comparator 10 because a level of the electric signal from amplifier 8k takes a negative value in relation to the electric signal from the sensor 9. The low level signal from comparator 10 is then applied to the drive circuit 12. In this instance, the upshift pattern has an upshift line compensated by the calculated value $l_1$ in the second operational amplifier 8k. Thus, the drive circuit 12 energizes the 1-2 shift solenoid 13 in response to the low level signal from comparator 10 to condition the transmission 14 in the first forward speed range.

When an accelerator pedal is depressed at this stage, the throttle valve is opened to start and gradually accelerate the vehicle. Then, an electric signal indicative of an opening degree of the throttle valve is produced from the sensor 9, and an electric signal in the form of an analog voltage S is also produced from the speed sensor 1, as previously described. These electric signals from sensors 1, 9 are respectively applied to the operational amplifier 8a and comparator 10. The analog voltage S is multiplied in the amplifier 8a by the amplitude K and is applied to the second operational amplifier 8k as an electric signal indicative of the multiplied value KS. Then, the above calculated value $l_1$ is subtracted in the amplifier 8k from the multiplied value KS and is applied to the comparator as an electric signal indicative of the subtracted value $(KS-l_1)$. In this instance, the comparator 10 still produces the low level signal because the subtracted value $(KS-l_1)$ is lower than the level of the electric signal from the sensor 9. This means that the energization of the 1-2 shift solenoid 13 is maintained to hold the first forward speed range of the transmission 14.

When the vehicle speed reaches an upshift point on the upshift line noted above, the level of the electric signal from the amplifier 8k becomes higher than that of the electric signal from the sensor 9, and an electric high level signal is then produced from the comparator 10 and applied to the drive circuit 12. Thus, the drive circuit 12 deenergizes the 1-2 shift solenoid 13 so that the transmission is shifted from the first forward speed range into the second forward speed range. Simultaneously, the shift pattern is shifted from the upshift line to the downshift line due to operation of the positive feedback resistor 11 of the comparator 10 to prevent fluctuation between the first and second forward speed ranges. From the above description, it will be noted that the 1-2 shift operation of transmission 14 is well controlled due to the compensated upshift line, thereby ensuring good driveability of the vehicle.

When at this stage the accelerator pedal is deeply depressed to accelerate the vehicle, the level of the electric signal from the throttle position sensor 9 becomes higher than that of the electric signal from the second operational amplifier 8k, and an electric low level signal is produced from the comparator 10 and applied to the drive circuit 12. Then, the drive circuit 12 energizes the 1-2 shift solenoid 13 in response to the low level signal from comparator 10 so that the transmission 14 is shifted from the second forward speed range to the first forward speed range. In this instance, the shift pattern is shifted from the downshift line to the upshift line due to operation of the positive feedback resistor 11 of comparator 10 to prevent fluctuation between the two forward speed ranges. From the above description, it will be noted that the forced downshift of the transmission 14 is well conducted by the compensated downshift line, thereby ensuring smooth acceleration of the vehicle.

When the vehicle speed reaches an upshift point on the upshift line due to the above-noted acceleration, the electric signal from the amplifier 8k becomes higher at its level than that of the electric signal from the sensor 9, and an electric high level signal is produced from the comparator 10. Then, the drive circuit 12 deenergizes the 1-2 shift solenoid 13 in response to the high level signal from the comparator 10 so that the transmission 14 is shifted from the first forward range to the second forward range.

In case the EGR system is activated in the above-noted operational mode, an electric signal with a high level $b_1$ is produced from EGR sensor 3, as previously described and is applied to the second operational amplifier 8k. Then, a value $(a_0b_0+a_1b_1+a_3b_3+a_4b_4+a_5b_5)$ or $l_2$ is calculated in the amplifier 8k by using the electric signal from EGR sensor 3 together with the electric signals from the generator 2 and sensors 5, 6, 7. Thereafter, the calculated value $l_2$ is subtracted from the multiplied value KS defined by the electric signal from the first operational amplifier 8a, and the subtracted value $(KS-l_2)$ is applied to the comparator 10. In this instance, a shift pattern defined by the calculated value $l_2$ is displaced by the value $a_1b_1$ from the shift pattern defined by the calculated value $l_1$ in the rightward direction in FIG. 2. From the above description, it will be understood that even if output power of the engine decreases due to operation of the EGR system, the shift operation of the transmission 14 is well conducted due to the compensated shift pattern to ensure good driveability of the vehicle.

In case the car cooler is activated in the above-noted operational mode, an electric signal with a high level $b_2$ is produced from the cooler sensor 4, as previously described and is applied to the second operational amplifier 8k. Then, a value $(a_0b_0+a_2b_2+a_3b_3+a_4b_4+a_5b_5)$ or $l_3$ is calculated in the amplifier 8k by using the electric signal from cooler sensor 4 together with the electric signals from the generator 2 and sensors 5, 6, 7. Thereafter, the calculated value $l_3$ is subtracted from the multiplied value KS defined by the electric signal from the first operational amplifier 8$k$, and the subtracted value (KS−$l_3$) is applied to the comparator 10. In this instance, a shift pattern defined by the calculated value $l_3$ is displaced by the value $a_2b_2$ from the shift pattern defined by the calculated value $l_1$ in the rightward direction in FIG. 2. From the above description, it will be understood that even if an engine load increases due to activation of the car cooler, the shift operation of transmission 14 is well conducted due to the compensated shift pattern to ensure good driveability of the vehicle.

In case the amount of the vehicle loads increases in the above-noted operational mode, the level $b_3$ of the electric signal from the load sensor 5 increases. Then, the calculated value $l_1$ in the operational amplifier 8$k$ increases in accordance with increase of the level $b_3$. Thus, the shift pattern defined by the calculated value $l_1$ is displaced due to increase of the level $b_3$ in the rightward direction in FIG. 2. From the above description, it will be understood that even if an engine load increases due to increase of the amount of the vehicle loads, the shift operation of transmission 14 is well conducted due to the compensated shift pattern to ensure good driveability of the vehicle.

In case the advancing degree of the spark advancer increases in the above-noted operational mode, the level $b_4$ of the electric signal from the advance angle sensor 6 lowers to decrease the calculated value $l_1$ in the operational amplifier 8$k$. Thus, the shift pattern defined by the calculated value $l_1$ is displaced due to decrease of the level $b_4$ in the leftward direction in FIG. 2. As a result, the shift operation of transmission 14 is well controlled in accordance with changes of engine output power caused by changes of the advancing degree.

In case the sloping degree of the road increases in the above-noted operational mode, the level $b_5$ of the electric signal from the slope sensor 7 increases. Then, the calculated value $l_1$ in the operational amplifier 8$k$ increases in accordance with increase of the level $b_5$. Thus, the shift pattern defined by the calculated value $l_1$ is displaced due to increase of the level $b_5$ in the rightward direction in FIG. 2. From the above description even if an engine load increases due to increase of the sloping degree of the road, the shift operation of transmission 14 is well conducted due to the compensated shift pattern to ensure good driveability of the vehicle. In addition, it will be also noted that even if changes of engine output power and various engine loads occur in superposed conditions, the shift operation of transmission 14 is well conducted to ensure good driveability.

Figure 3:
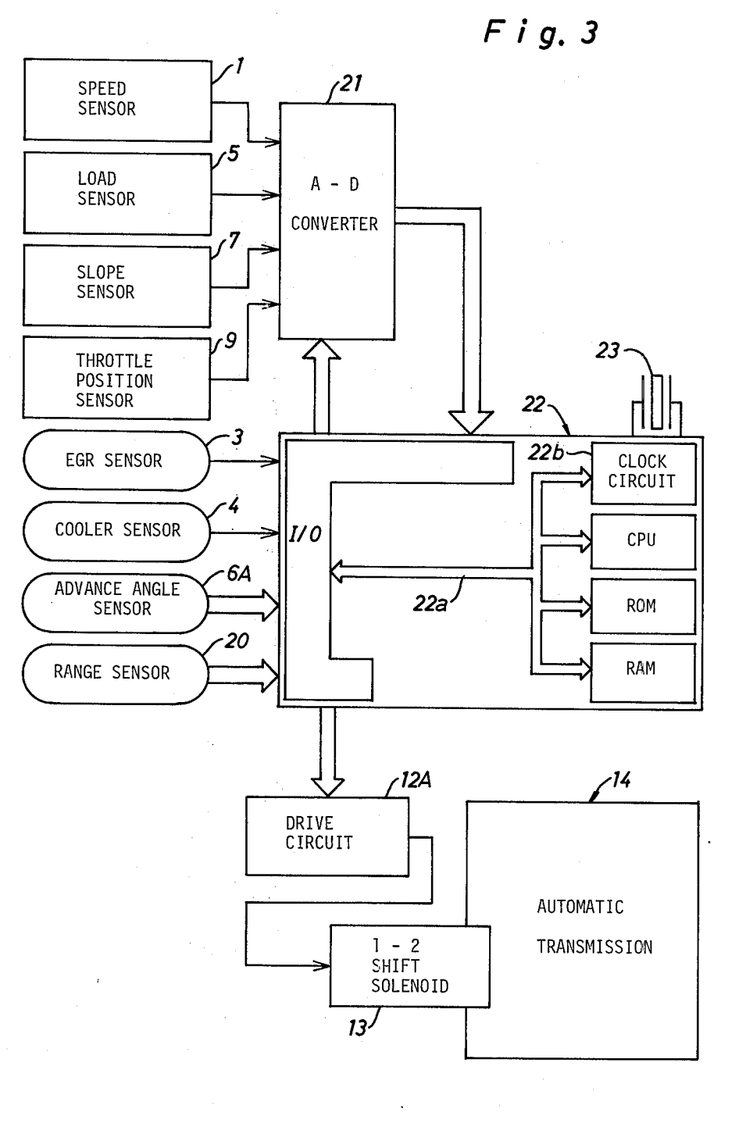
FIG. 3 is a schematic block diagram of the second preferred embodiment in accordance with the present invention.

FIG. 3 illustrates a second preferred embodiment of the present invention which is adapted to the transmission 14 of the previous embodiment. An analog-to-digital or A-D converter 21 is connected to the speed sensor 1, load sensor 5, slope sensor 7 and throttle position sensor 9 of the previous embodiment. The electric signals from sensors 1, 5, 7, 9 are respectively converted by the A-D converter 21 into electric binary signals. Each of the binary signals is applied to a digital computer 22 in response to a request issued from the computer 22.

The digital computer 22 is connected to the EGR sensor 3 and car cooler sensor 4 of the previous embodiment and is also connected to an ignition spark advance angle sensor 6A and a range sensor 20. The advance angle sensor 6A is provided within the ignition spark advancer of the previous embodiment in replacement of the advance angle sensor 6. The sensor 6A detects an advancing degree of the ignition spark advance to produce therefrom an electric binary signal indicative of the advancing degree $b_4$. The range sensor 20 is provided on the manual shift lever of the transmission 14. When the shift lever is selectively positioned in its Neutral, Parking, Drive, Low and Reverse positions, the range sensor 20 detects a selected position of the shift lever to produce an electric signal indicative of the selected position. The computer 22 is also connected to the ignition switch through a voltage stabilizer and receives a constant voltage of five volts from the stabilizer to be conditioned in its operation. The voltage stabilizer receives the electric voltage from the vehicle battery due to actuation of the ignition switch to produce the constant voltage.

The digital computer 22 is a single chip LSI microcomputer and comprises a central processing unit or CPU which is connected to an input-output device or I/O through a data bus 22$a$. CPU is also connected through data bus 22$a$ to a clock circuit 22$b$, a read only memory or ROM, and a random access memory or RAM. I/O receives the binary signals from the A-D converter 21 and advance angle sensor 6A to temporarily memorize them in RAM. I/O also receives the electric signals from the sensors 3, 4, 20 to temporarily memorize them in RAM. These memorized signals in RAM are selectively read out and applied by I/O to CPU through data bus 22$a$.

A program is previously stored in ROM such that CPU sets a reference value for a reference point of the upshift line (see FIG. 2) into a first predetermined value M when the transmission 14 is conditioned in the first forward speed range, and also sets a reference value for a reference point of the downshift line into a second predetermined value m when the transmission 14 is not conditioned in the first forward speed range. The first predetermined value M is determined smaller than the second predetermined value m to define the hysteresis for preventing the fluctuation between the first and second forward ranges. The first and second predetermined values M, m are previously memorized in ROM respectively. The program is also stored in ROM such that CPU calculates a value [$a_0m$(or $a_0M$)$+a_1b_1+a_2b_2+a_3b_3+a_4b_4+a_5b_5$] or 1 from the above-noted weighted coefficients $a_0$ to $a_5$ and one of the first and second predetermined values M, m. The weighted coefficients $a_0$ to $a_5$ are previously memorized in ROM respectively. The program is further stored in ROM such that CPU calculates a value (KS−1) from the above-noted linear function. The slope K is previously stored in ROM.

The clock circuit 22$b$ is cooperable with a crystal oscillator 23 to produce clock signals at a predetermined frequency. CPU executes the computer program in accordance with the clock signals from clock circuit 23. CPU serves to set the reference value for the upshift line into the first predetermined value M by means of the program when discriminated the fact that the transmission 14 is conditioned in the first forward range. When discriminated the fact that the transmission 14 is not conditioned in the first forward range, CPU serves to set the reference value for the downshift line into the second predetermined value m. CPU also calculates the value 1 by using the memorized weighted coefficients and one of the values M, m from ROM and then calculates the value (KS−1) by using the slope K from ROM and the binary signal indicative of the vehicle speed from RAM. When the calculated value (KS−1) is smaller than the opening degree $\theta$ of the throttle valve defined by the binary signal from RAM, CPU produces a first output signal therefrom. When the calculated value (KS−1) is larger than the opening degree $\theta$, CPU produces a second output signal therefrom. The first and second output signals from CPU are respectively applied to a drive circuit 12A through I/O. In practice of the present invention, a microcomputer of 8048 type manufactured by INTEL CORP. has been used as the computer 22 due to its commercial availability. Detail description regarding the microcomputer is eliminated because the particular construction and programming process is well known in the prior art.

The drive circuit 12A includes a flip-flop for receiving the first and second output signals from computer 22. The flip-flop is set in response to the first output signal to produce a first electric pulse therefrom. The flip-flop is reset in response to the second output signal to produce a second electric pulse therefrom. The first and second output pulses from the flip-flop are respectively amplified by an amplifier and applied to the 1-2 shift solenoid 13. The shift solenoid 13 is energized in response to the amplified first output pulse from the amplifier such that the transmission 14 is conditioned in the first forward speed range. The shift solenoid 13 is deenergized in response to the amplified second output pulse from the amplifier such that the transmission 14 is conditioned in the second forward speed range.

MODE OF OPERATION

When the ignition switch is actuated with the shift lever positioned to its Parking position, the digital computer 22 is conditioned in its operation upon receiving the constant voltage from the stabilizer, and the engine is cranked and then started. In this instance, the transmission 14 is conditioned in the Parking range. Then, execution in computer 22 is initiated at a point 101 according to a flow chart shown in FIG. 4 and proceeds to a point 102. At this stage, the speed sensor 1 detects standstill of the vehicle to produce an electric signal with a zero level, and the load sensor 5 detects an amount of loads on the vehicle to produce an electric signal with a level $b_3$. The slope sensor 1 also detects a sloping degree of the road to produce an electric signal with a level $b_5$, and the throttle position sensor 9 detects a fully closed position of the throttle valve to produce an electric signal with a zero level. These electric signals are respectively converted by the A-D converter 21 into electric binary signals. Furthermore, the EGR sensor 3 detects deactivation of the EGR system to produce an electric signal with a zero level, and the cooler sensor 4 detects deactivation of the car cooler to produce an electric signal with a zero level. The advance angle sensor 6A detects an advancing degree of the spark advancer to produce an electric binary signal indicative of the advancing degree $b_4$, and the range sensor 20 detects the Parking position of the shift lever to produce an electric signal indicative of the Parking position. The binary signals from the converter 21 and sensor 6A and the electric signals from the sensors 3, 4, 20 are respectively applied to and temporarily memorized in RAM of computer 22.

Figure 4:
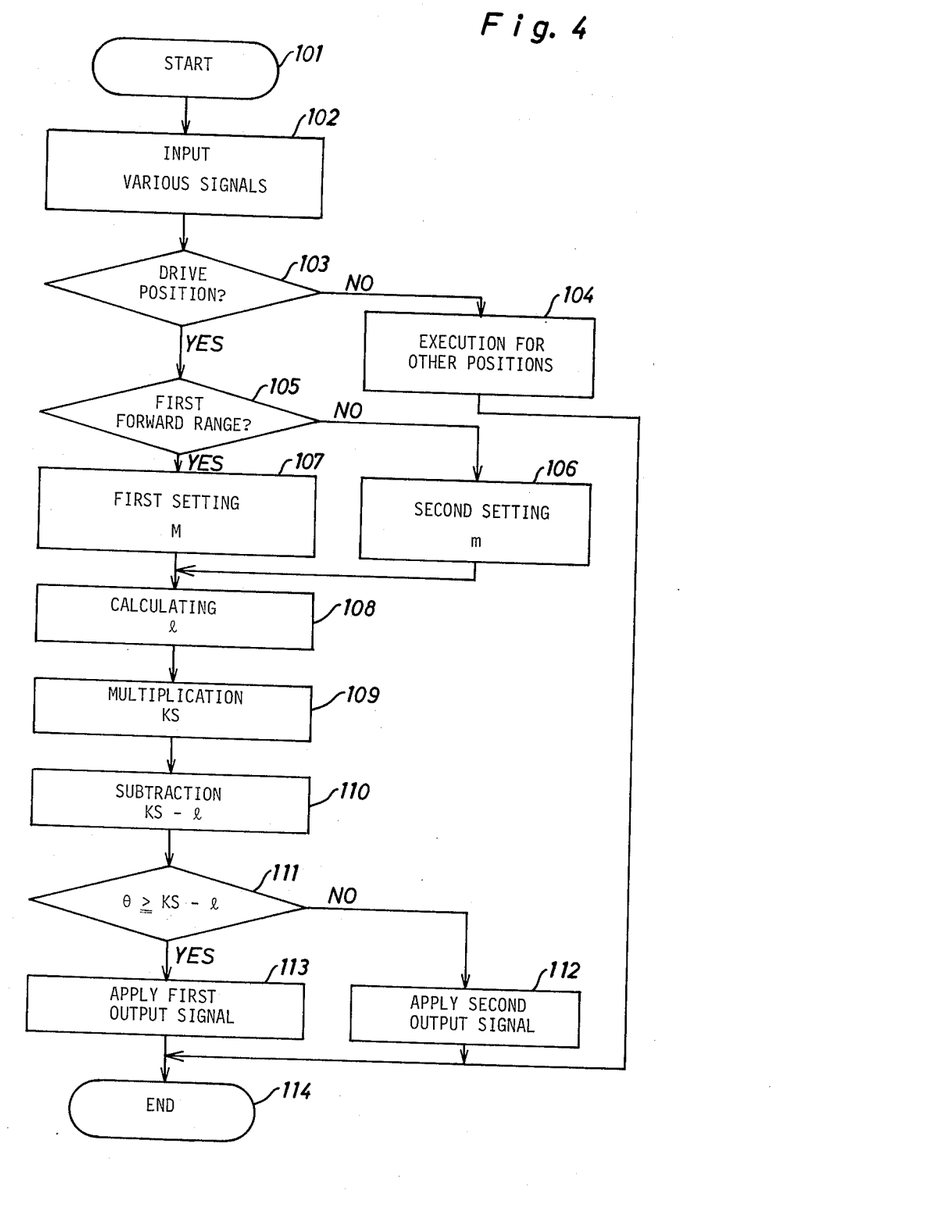
FIG. 4 is a flow diagram illustrating the programming of the digital computer shown in FIG. 3.

When the computer program proceeds to a point 103, CPU discriminates as "no" by using the electric signal indicative of the Parking position from RAM and proceeds the program to a point 104. Then, the execution of the computer program is performed such that any output signal is not produced from CPU, and the computer program proceeds to a point 114. Thereafter, the above-noted execution from point 101 to point 114 through point 104 is repeated till the shift lever is positioned in the Drive position. When the shift lever is positioned in the Drive position during the above-noted repetitive executions, the transmission 14 is shifted from the Parking range to the Drive range, and the range sensor 20 detects the Drive position of the shift lever to produce an electric signal indicative of the Drive position. The electric signal from the range sensor 20 is applied to and temporarily memorized in RAM at point 102, the program proceeding to point 103. Then, CPU discriminates as "yes" by using the electric signal indicative of the Drive position from RAM and preceeds the program to the following point 105. Subsequently, CPU discriminates as "no" from the executed result at the point 105 and proceeds the computer program to a point 106. At this point 106, a reference value for the downshift line is set into the second predetermined value m read out from ROM.

When the program proceeds from point 106 to a point 108, CPU calculates a value $(a_0m + a_3b_3 + a_4b_4 + a_5b_5)$ or $l_1$ by using the set value m, the binary signals from RAM and the weighted coefficient $a_0$, $a_3$ to $a_5$ from ROM, the program proceeding to a point 109. Then, the slope K is read out from ROM and multiplied in CPU by the vehicle speed of the zero level defined by the binary signal from RAM. Subsequently, the calculated value $l_1$ is subtracted from the multiplied result zero at the following point 110. When the computer program proceeds to a point 111, CPU discriminates as "yes" because the subtracted value $(-l_1)$ is negative. Then, a first output signal is produced from CPU at a point 113 and applied to the drive circuit 12A through a point 114.

When the drive circuit 12A receives the first output signal from computer 22, as previously described, it energizes the 1-2 shift solenoid 13 to condition the transmission 14 in the first forward speed range. When the next execution of the program proceeds to point 105, CPU discriminates as "yes" because the transmission 14 is conditioned in the first forward speed range, the program proceeding to a point 107. Then, a reference value for the upshift line is set into the first predetermined value M read out from ROM. Subsequently, a value $(a_0M + a_3b_3 + a_4b_4 + a_5b_5)$ is calculated by CPU at point 108, as previously described. Then, the slope K is multiplied by the vehicle speed of zero level at point 109, and the calculated value $(a_0M + a_3b_3 + a_4b_4 + a_5b_5)$ is subtracted from the multiplied result zero at point 110. Thereafter, at point 111, CPU discriminates as "yes" because the subtracted value is negative, and shifts the shift pattern to an upshift line.

When the accelerator pedal is depressed, the throttle valve is opened to start and gradually accelerate the vehicle. Then, an electric signal indicative of the opening degree of the throttle valve is produced from sensor 9, and an electric signal indicative of the vehicle speed is also produced from the speed sensor 1, as previously described. The electric signals from sensors 1, 9 are converted by the A-D converter 21 together with electric signals from sensors 5, 7 and are applied to computer 22 as electric binary signals. Electric signals are also produced from the sensors 3, 4, 6A, 20 and applied to computer 22. When the computer program proceeds to point 102 during repetitive executions, all the electric signals applied to computer 22 are applied to and temporarily memorized in RAM, and thereafter the program proceeds to point 111, as previously described. Then, CPU discriminates as "yes" because the opening degree of the throttle valve is still larger than the subtracted value $(KS-l_1)$. Thus, CPU produces an output signal such that the drive circuit 12A maintains the energization of 1-2 shift solenoid 13 to hold the first forward speed range.

When the vehicle speed reaches an upshift point on the above-noted upshift line, CPU discriminates as "no" at point 111 because the subtracted value $(KS-l_1)$ is larger than the opening degree of the throttle valve, the program proceeding to a point 112. Then, CPU produces therefrom a second output signal which is applied to the drive circuit 12A. Thus, the drive circuit 12A deenergizes the shift solenoid 13 so that the transmission 14 is shifted from the first forward speed range into the second forward speed range. When the next execution of the program proceeds to point 105, CPU discriminates as "no" because the transmission 14 is conditioned in the second forward speed range, the program proceeding to point 106. Then, a reference value for the downshift line is set into the second predetermined value m from ROM. Thereafter, the shift pattern is shifted from the upshift line to a down shift line, as previously described. From the above description, it will be noted that the 1-2 shift operation of the transmission 14 is well controlled due to the upshift line compensated by the value $l_1$, thereby to ensure good driveability of the vehicle. Furthermore, even if changes of engine output power and various engine loads occur in superposed operative conditions of the vehicle, the shift operation of transmission 14 will be well controlled due to a compensated shift pattern to ensure good driveability.

Hereinafter, described is a modification of the previous embodiment which is adapted to another automatic transmission. The transmission is provided with 1-2 shift solenoid for selectively conducting shift operation between first and second forward speed ranges on a basis of a 1-2 shift pattern shown in FIG. 5. The transmission is also provided with a 2-3 shift solenoid for selectively conducting shift operation between second and third forward speed ranges on a basis of a 2-3 shift pattern shown in FIG. 5. The 1-2 and 2-3 shift patterns are respectively defined by first and second linear functions $(\theta = KS - l_a)$ and $(\theta = KS = l_b)$. In this case, the characters $l_a$, $l_b$ respectively indicate intercepts of the first and second functions. Other construction and function of the transmission are similar to those of the transmission in FIG. 3.

Figure 5:
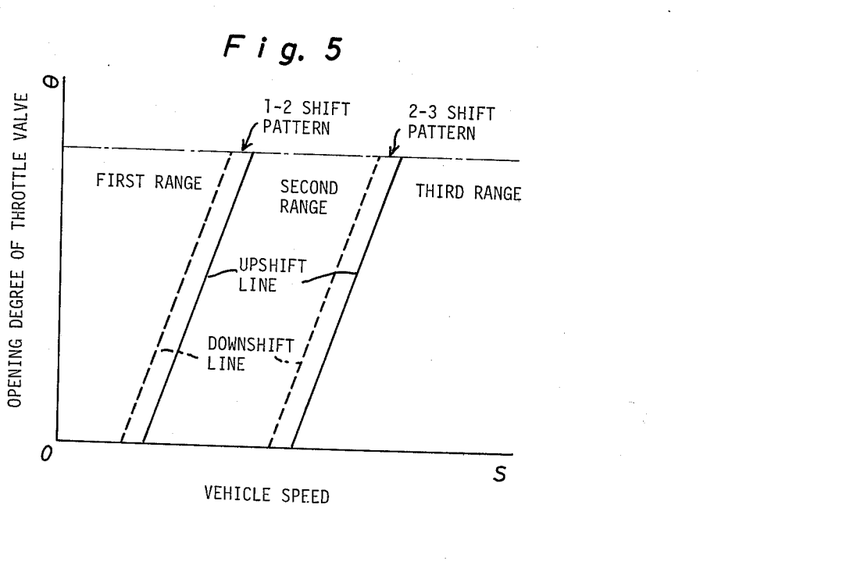
FIG. 5 is a graph indicating a shift pattern for another automatic transmission.

In the modification, a digital computer is previously programmed such that reference values for upshift and downshift lines of the 1-2 shift pattern are respectively set in predetermined values $M_1$ and $m_1$ and also such that reference values for upshift and downshift lines of the 2-3 shift pattern are respectively set in predetermined values $M_2$ and $m_2$. The predetermined value $M_1$ is determined smaller than the predetermined value $m_1$ to prevent fluctuation between the first and second forward speed ranges. The predetermined value $M_2$ is determined smaller than the predetermined value $m_2$ to prevent fluctuation between the second and third forward speed ranges. These predetermined values $M_1$, $M_2$, $m_1$, $m_2$ are previously memorized in the computer. The computer is also programmed to calculate a value $[a_0 m_1 (\text{or } a_0 M_1) + a_1 b_1 + a_2 b_2 + a_3 b_3 + a_4 b_4 + a_5 b_5]$ or $l_a$ from the above-noted weighted coefficients $a_0$ to $a_5$ and one of the predetermined values $M_1$, $m_1$ and to calculate a value $[a_0 m_2 (\text{or } a_0 M_2) + a_1 b_1 + a_2 b_2 + a_3 b_3 + a_4 b_4 + a_5 b_5]$ or $l_b$ from the weighted coefficients $a_0$ to $a_5$ and one of the predetermined values $M_2$, $m_2$. The computer is further programmed to calculate values $(KS - l_a)$ and $(KS - l_b)$ from the above-noted linear functions respectively. The computer produces therefrom first, second and third output signals, as similar in the previous embodiment, to be applied to first and second drive circuits.

Upon receiving the second output signal from the computer, the first drive circuit energizes the 1-2 shift solenoid and the second drive circuit deenergizes the 2-3 shift solenoid such that the transmission is conditioned in the first forward speed range. When the computer produces the second output signal, the first drive circuit deenergizes the 1-2 shift solenoid and the second drive circuit energizes the 2-3 shift solenoid such that the transmission is conditioned in the second forward speed range. Upon receiving the third output signal from the computer, the second drive circuit deenergizes the 2-3 shift solenoid under deenergization of the 1-2 shift solenoid to condition the transmission in the third forward speed range.

Figure 6:
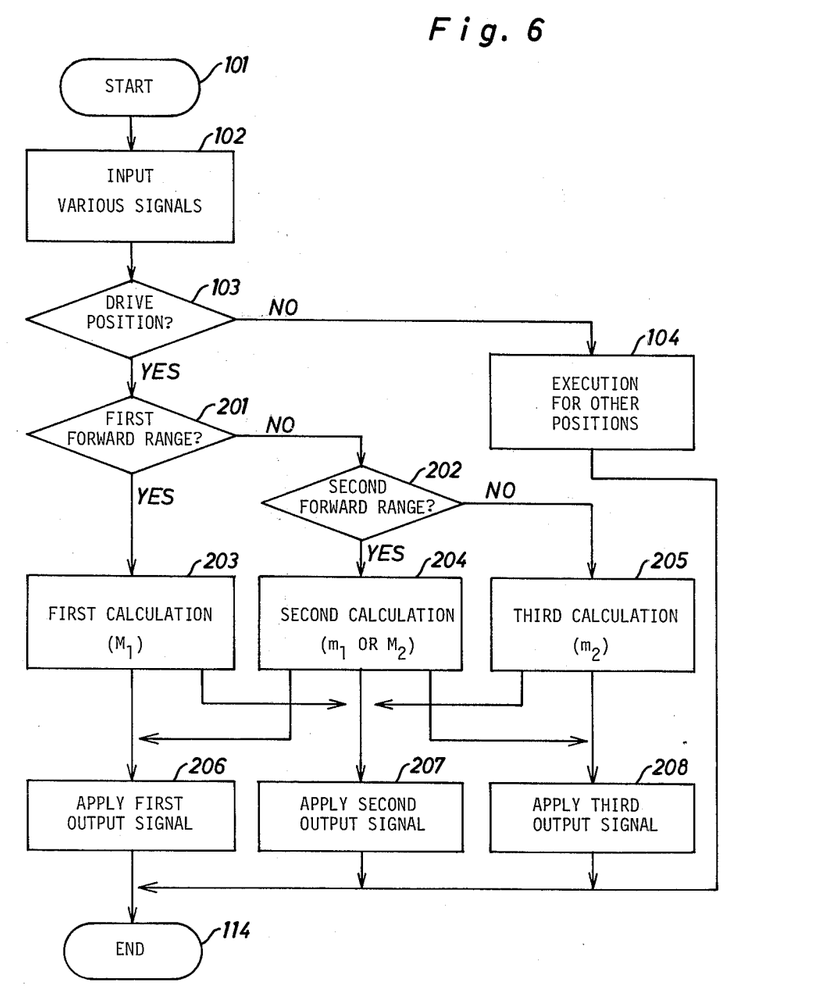
FIG. 6 is a flow diagram illustrating the programming of a digital computer adapted in a modification of the second preferred embodiment, the flow diagram being used to control the shift pattern of FIG. 5.

In operation, assuming that the execution of the computer program proceeds from the point 101 to a point 201 corresponding with the point 105 of FIG. 4, as shown by a flow diagram of FIG. 6, a discrimination is made in the computer as to whether the transmission is conditioned in the first forward speed range or not. If the transmission is conditioned in the first forward speed range, the discrimination in the computer is made as "yes", and the program proceeds to a point 203. When the reference value for the 1-2 shift pattern is set into the predetermined value $M_1$, the 1-2 shift pattern is defined as an upshift line, and a first calculation is made in the computer as similar in the points 108 to 111 of FIG. 4. If at this stage the first calculation value is smaller than an opening degree of the throttle valve, the program proceeds to a point 206, and a first output signal is produced from the computer and applied to the first and second drive circuits. Thus, the first drive circuit energizes the 1-2 shift solenoid and the second drive circuit deenergizes the 2-3 shift solenoid so that the transmission is conditioned in the first forward speed range. If the first calculation value is larger than the opening degree of the throttle valve, the program proceeds to a point 207, and a second output signal is produced from the computer and applied to the first and second drive circuits. Thus, the first drive circuit deenergizes the 1-2 shift solenoid, and the second drive circuit energizes the 2-3 shift solenoid so that the transmission is conditioned in the second forward speed range.

If the transmission is not conditioned in the first forward speed rage at the above point 201, the discrimination in the computer is made as "no", and the program proceeds to a point 202. Then, a discrimination is made in the computer as to whether the transmission is conditioned in the second forward speed range or not. If the transmission is conditioned in the second forward speed range, the discrimination is made as "yes", and the program proceeds to a point 204. When the reference value for the 1-2 shift pattern is set into the predetermined value $m_1$, the 1-2 shift pattern is defined as a downshift line, and a second calculation is made in the computer as similar at the above point 203 of FIG. 6. At point 204, a discrimination is also made in the computer as to whether or not the second calculation value is smaller than an opening degree of the throttle valve.

If the second calculation value is smaller than the opening degree of the throttle valve, a first output signal is produced from the computer and is applied to the first and second drive circuits. Then, the first drive circuit energizes the 1-2 shift solenoid, and the second drive circuit deenergizes the 2-3 shift solenoid so that the transmission is shifted from the second forward speed range to the first forward speed range. If the second calculation value is larger than the opening degree of the throttle valve, the reference value for the 2-3 shift pattern is set into the predetermined value $M_2$, and the second shift pattern is defined as an upshift line in FIG. 5. If the vehicle speed does not reach an upshift point on the 2-3 upshift line, the program proceeds to a point 207, and a second output signal is produced from the computer and applied to the drive circuits. Thus, the drive circuits drive the 1-2 and 2-3 shift solenoids respectively such that the transmission is maintained in the second forward speed range. If the vehicle speed reaches the upshift point on the 2-3 upshift line, the computer program proceeds to a point 208, and a third output signal is produced from the computer and applied to the drive circuits. Thus, the drive circuits deenergizes the 1-2 and 2-3 shift solenoids so that the transmission is shifted from the second forward speed range to the third forward speed range.

If the transmission is conditioned in the third forward speed range at the above point 202, the discrimination is made as "no", and the program proceeds to a point 205. When the reference point for the 2-3 shift pattern is set into the predetermined value $m_2$, the 2-3 shift pattern is defined as a downshift line, and a third calculation is made in the computer as similar at the point 204. Subsequently, a discrimination is made in the computer as to whether or not the third calculation value is smaller than an opening degree of the throttle valve. If the third calculation value is smaller than an opening degree of the throttle valve, the program proceeds to point 207, and a second output signal is produced from the computer. Thus, the drive circuits drive the 1-2 and 2-3 shift solenoids respectively so that the transmission is shifted down from the third forward range.

In the above-noted operation, it will be easily understood that even if changes of engine output power and various engine loads occur in superposed operative conditions of the vehicle, the shift patterns will be respectively compensated to well control shift operation of the transmission, thereby to ensure good driveability of the vehicle.

While in the above embodiments each linear function is adapted to define each shift pattern for the transmission, it may be changed into a non-linear function and the like.

Although in the above embodiments each linear function is modified in its intercept to compensate each shift pattern, it may be also modified in its intercept and slope to compensate each shift pattern.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An electric control apparatus for an automatic transmission of an automotive vehicle, said transmission including electrically operated shift means for conducting one of upshift and downshift operations of said transmission upon energization thereof and conducting the other shift operation of said transmission upon deenergization thereof, said electric control apparatus comprising:

first means for producing a first electric signal indicative of the actual vehicle speed;

second means for producing a second electric signal indicative of the actual throttle opening angle of a prime engine of the vehicle;

third means for producing a third electric signal indicative of various loads given to said prime engine;

control means responsive to said first and third electric signals for calculating a first value $\theta$ of the throttle opening angle based on a shift pattern defined by a linear function $\theta = KS - 1$, in which K is a constant, S is a value of said first electric signal, and l is a value of said third electric signal, said control means displacing an intercept of said shift pattern in relation to a change of the value of said third electric signal and being responsive to said second electric signal to compare said first value with a second value represented by said second electric signal for producing a first control signal when said first value is smaller than said second value and for producing a second control signal when said first value is larger than said second value; and drive means for energizing said shift means in response to said first control signal and for deenergizing said shift means in response to said second control signal.

2. An electric control apparatus as claimed in claim 1, wherein said control means comprises:

a first operational amplifier for determining the constant K of said linear function, said first operational amplifier being responsive to said first electric signal and multiplying said constant K by said value S of said first electric signal;

a second operational amplifier responsive to said third electric signal for subtracting said value l of said third electric signal from the multiplied value KS so as to provide a subtracted value $KS-1$; and a comparator responsive to said second electric signal for comparing the subtracted value $KS-1$ with a value of said second electric signal, said comparator producing a first control signal when said subtracted value is smaller than the value of said second electric signal and producing a second control signal when the subtracted value is larger than the value of said second electric signal.

3. An electric control apparatus for controlling an automatic transmission of an automotive vehicle, wherein the transmission includes electrically operated shift means for conducting one of upshift and downshift operations of said transmission upon energization thereof and conducting the other shift operation of said transmission upon deenergization thereof, said electric control apparatus comprising:

first means for producing a first electric signal indicative of the actual vehicle speed;

second means for producing a second electric signal indicative of the actual throttle opening angle of a prime engine of the vehicle;

third means for producing a third electric signal indicative of various loads given to said prime engine;

control means responsive to said first and third electric signals for calculating a first value of the throttle opening angle based on a shift pattern defined by a desired relationship among the vehicle speed, the throttle opening angle and the various loads, said control means compensating the shift pattern in accordance with a value of said third electric signal and being responsive to said second electric signal to compare said calculated first value with a second value represented by said second electric signal for producing a first control signal when said first value is smaller than said second value and for producing a second control signal when said first value is larger than said second value; and drive means for energizing said shift means in response to said first control signal from said control means and for deenergizing said shift means in response to said second control signal from said control means.

4. An electric control apparatus as claimed in claim 1, wherein said third means includes detecting means for producing electric signals respectively indicative of an amount of loads on the vehicle and a slant degree of the vehicle.

5. An electric control apparatus as claimed in claim 1, wherein said third means includes detecting means for producing electric signals respectively indicative of operation of a car cooler and an exhaust gas recirculation system for the vehicle.

6. An electric control apparatus for an automatic transmission of an automotive vehicle, said transmission including electrically operated shift means for conducting one of upshift and downshift operations of said transmission upon energization thereof and conducting the other shift operation of said transmission upon deenergization thereof, said electric control apparatus comprising:

first means for producing a first electric signal indicative of the actual vehicle speed;

second means for producing a second electric signal indicative of the actual throttle opening angle of a prime engine of the vehicle;

third means for producing a third electric signal indicative of various loads given to said prime engine;

an analog-to-digital converter for converting said electric signals into first, second and third digital signals respectively;

a digital computer responsive to said first and third digital signals for calculating a first value $\theta$ of the throttle opening angle based on a linear function $\theta = KS - 1$, in which K is a constant, S is a value of said first digital signal, and l is a value of said third digital signal, said digital computer displacing an intercept of said linear function in relation to change of the value of said third digital signal and being responsive to said second digital signal to compare said first value with a second value represented by said second digital signal for producing a first control signal when said first value is smaller than said second value and for producing a second control signal when said first value is larger than said second value; and drive means for energizing said shift means in response to said first control signal and for deenergizing said shift means in response to said second control signal.

7. A method for controlling an automatic transmission of an automotive vehicle, said transmission including electrically operated shift means for conducting one of upshift and downshift operations of said transmission upon energization thereof and conducting the other shift operation of said transmission upon deenergization thereof, said method comprising the steps of:

producing a first electric signal indicative of the actual vehicle speed;

producing a second electric signal indicative of the actual throttle opening angle of a prime engine of the vehicle;

producing a third electric signal indicative of various loads given to said prime engine;

calculating a first value of the throttle opening angle based on a shift pattern defined by a desired relationship among the vehicle speed, the throttle opening angle and the various loads, the shift pattern being compensated in accordance with a value of said third electric signal during the calculation;

comparing the calculated first value with a second value represented by said second electric signal for producing a first control signal when said first value is smaller than said second value and for producing a second control signal when said first value is larger than said second value; and energizing said shift means in response to said first control signal and deenergizing said shift means in response to said second control signal.

* * * * *